(12) United States Patent
Troia et al.

(10) Patent No.: US 11,392,300 B2
(45) Date of Patent: Jul. 19, 2022

(54) MEMORY DEVICE HAVING A SECURE TEST MODE ENTRY

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 264 days.

(21) Appl. No.: 16/624,473

(22) PCT Filed: May 31, 2019

(86) PCT No.: PCT/IB2019/000481
§ 371 (c)(1),
(2) Date: Dec. 19, 2019

(87) PCT Pub. No.: WO2020/240237
PCT Pub. Date: Dec. 3, 2020

(65) Prior Publication Data
US 2021/0334017 A1    Oct. 28, 2021

(51) Int. Cl.
*G06F 3/06* (2006.01)
*H04L 9/08* (2006.01)
*H04L 9/32* (2006.01)

(52) U.S. Cl.
CPC .......... *G06F 3/0622* (2013.01); *G06F 3/0655* (2013.01); *G06F 3/0679* (2013.01); *H04L 9/088* (2013.01); *H04L 9/3236* (2013.01)

(58) Field of Classification Search
CPC ........ G06F 21/31; G06F 21/72; G06F 3/0622; G06F 3/0655; G06F 3/0679;
(Continued)

(56) References Cited

U.S. PATENT DOCUMENTS 9,767,319 B2    9/2017  Chen
10,193,694 B1   1/2019  Guditz et al.
(Continued)

FOREIGN PATENT DOCUMENTS

EP      1983466 A2    10/2008

OTHER PUBLICATIONS

International Search Report and Written Opinion from related International application No. PCT/IB2019/000481, dated Feb. 3, 2020, 13 pages.

*Primary Examiner* — Hashem Farrokh
(74) *Attorney, Agent, or Firm* — Brooks, Cameron & Huebsch, PLLC (57) ABSTRACT

The present disclosure relates to a memory device comprising:
an array of memory cells; and
an access management architecture providing a secure access to a test mode of the array of memory cells,
the access management architecture comprising:
a register group comprising data identifying the memory device;
a cryptographic algorithm calculating an internal signature having a mechanism for ensuring data freshness;
a non volatile memory area storing specific data to be used by the cryptographic algorithm for calculating the internal signature;
a comparison block for comparing the calculated internal signature with a user provided signature to generate an enable signal allowing access to a test mode of the array of memory cells.
The disclosure also relates to a System-on-Chip (SoC) component comprising a memory device as well as to a method for managing access to a memory array into a test mode.

18 Claims, 6 Drawing Sheets

(58) Field of Classification Search
CPC ..... H04L 9/3226; H04L 9/088; H04L 9/3236; G11C 2029/4402; G11C 29/006; G11C 29/16; G11C 29/46; G11C 29/48; G11C 7/24
USPC .......................................... 711/164; 713/176
See application file for complete search history.

(56) References Cited

U.S. PATENT DOCUMENTS

| | | | |
|---|---|---|---|
| 2008/0137861 A1* | 6/2008 | Lindmo | G06F 21/31 380/270 |
| 2010/0333055 A1* | 12/2010 | Yu | G06F 11/267 716/108 |
| 2012/0069991 A1 | 3/2012 | Junod | |
| 2013/0007471 A1* | 1/2013 | Grab | G06F 21/10 713/193 |
| 2013/0125204 A1* | 5/2013 | La Fever | G06F 21/73 726/2 |
| 2016/0028728 A1* | 1/2016 | Hampel | G06F 21/71 713/156 |
| 2017/0214664 A1* | 7/2017 | Birgisson | H04L 9/3247 |
| 2019/0007212 A1 | 1/2019 | Neve de Mevergnies et al. | |

* cited by examiner

MEMORY DEVICE HAVING A SECURE TEST MODE ENTRY

PRIORITY INFORMATION

This application is a National Stage Application under 35 U.S.C. § 371 of International Application Number PCT/IB2019/000481, filed on May 31, 2019, the contents of which are incorporated herein by reference.

TECHNICAL FIELD

The present invention relates to memory devices and in particular to a memory device having a secure test mode entry.

BACKGROUND

Several applications would require access to a Flash memory array in a test mode during the manufacturing testing process but also during the working life of a component including such a Flash memory array.

Usually, a test mode of the Flash memory array can contain reserved operation that only the supplier of the component would like to use.

It is desirable to solve the test mode access tied problems, providing the memory device with a fine tuned level access algorithm, which could be useful to control the set of allowed operations for each user entering the test mode, so dealing with different privilege levels and different accessible testing modes.

DETAILED DESCRIPTION

With reference to those figures, a memory device comprising an array of memory cells, in particular a Flash memory array provided with an access management architecture will be disclosed herein.

As it will be described into details in the following, according to well known JTAG protocol, which employs additional registers to complement and expand the component functionalities, i.e. as in the case of the IEEE1532 standard, a Flash memory array may implement additional hardware and algorithms to ensure that only the right user having a correct authority can access to specific test modes and/or internal updates, in particular by a so called Flash Array Micro Sequencer firmware update.

More particularly, the proposed Flash memory array provided with an access management architecture, using a cryptographic algorithm, is aimed to correctly allow different test modes to be realized only to authorized accesses.

Cryptographic primitives are chosen being a good option to solve the authorization to access the Flash memory array in a test mode, namely in a factory reserved test mode.

An example memory device comprises:
- an array of memory cells; and
- an access management architecture providing a secure access to a test mode of the array of memory cells, the access management architecture comprising:
- a register group comprising data identifying the memory device;
- a cryptographic algorithm calculating an internal signature having a mechanism for ensuring data freshness;
- a non volatile memory area storing specific data to be used by the cryptographic algorithm for calculating the internal signature;
- a comparison block for comparing the calculated internal signature with a user provided signature to generate an enable signal allowing access to a test mode of the array of memory cells.

In an embodiment, the cryptographic algorithm may use a Secure HASH function or a MAC function.

Moreover, the memory device may further comprise a register for storing the internally calculated signature and a register being accessed from outside the memory array wherein a user is able to store a previously provided signature, for instance being a data register of the JTAG protocol.

Another example memory device comprises a further non volatile memory area storing a customer specific data to be used by the cryptographic algorithm for calculating the internal signature to authorize access to the memory array in more than one test mode and a decisional multiplexer receiving the specific data and the customer specific data and providing one of them to the cryptographic algorithm on the basis of a command signal.

The present disclosure also relates to a method for managing access to a memory array into a test mode comprising the steps of:
- providing data identifying the memory device, along with specific data to a cryptographic algorithm;
- calculating an internal signature;
- verifying data freshness;
- prompting a user to insert a previously provided signature;
- comparing the internally calculated signature with the user provided signature;
- allowing access to the memory array in a test mode in case of matching signatures.

The method may further comprise a step of further storing a customer specific data and a step for selecting the specific data or the customer specific data to access different testing modes The disclosure further relates to a System-on-Chip (SoC) component comprising a memory device in turn including:
- an array of memory cells; and
- an access management architecture providing a secure access to a test mode of the array of memory cells, the access management architecture comprising:
  a register group comprising data identifying the memory device;
  a cryptographic algorithm calculating an internal signature having a mechanism for ensuring data freshness;
  a non volatile memory area storing specific data to be used by the cryptographic algorithm for calculating the internal signature;
  a comparison block for comparing the calculated internal signature with a user provided signature to generate an enable signal allowing access to a test mode of the array of memory cells.

Memory devices are provided with so called testing pads being used to contact an external testing machine. The testing pads can be Input, Output or Input/Output pads and are connected to a memory array through low speed paths by means of suitable buffers. Moreover, respective ESD networks are connected to the testing pads which are subjected to ESDs, mainly due to the connection with the testing machine indeed. The connection of the testing machine with the testing pads should be followed by an access authentication for entry a correct test mode.

Figure 1A:
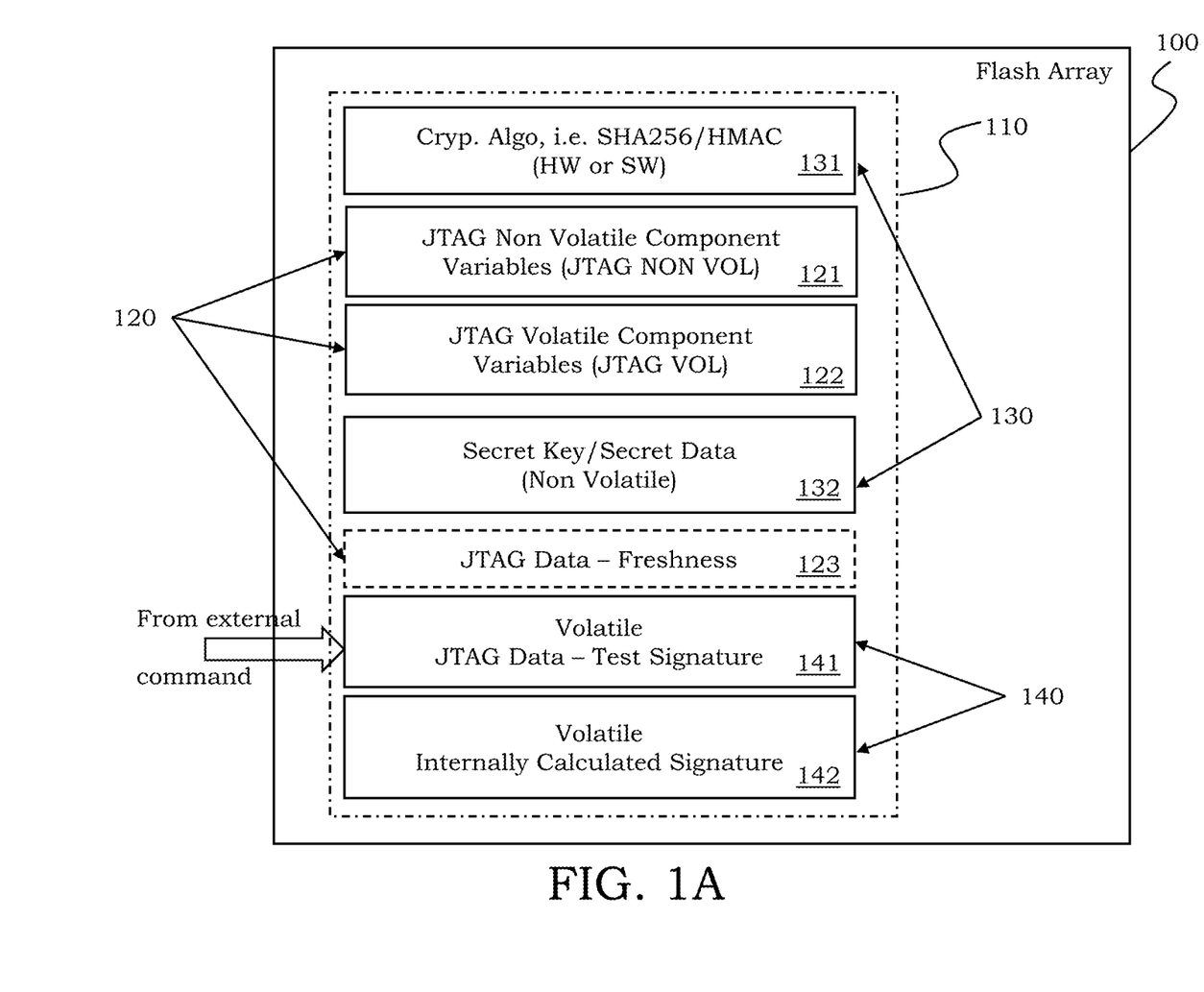
FIG. 1A shows a block diagram of a Flash memory array provided with an access management architecture in accordance with an embodiment of the present disclosure.

FIG. 1A is a block diagram of an example Flash memory array 100 provided with an access management algorithm which allows a secure access or entry to a test mode of the Flash memory array 100.

Flash memory array 100 comprises an access management architecture 110, comprising volatile and non volatile registers as well as logic and calculation means being functionally grouped within the Flash memory array 100, such access management architecture 110 receiving an external command from a user and providing and enabling signal which authorizes a specific test mode, particularly tied to the user access authorization level, as will be further clarified in the following description.

The access management architecture 110 comprises a register group 120, in turn including a first register 121 for the non volatile component variables JTAG NON VOL of the JTAG protocol, a second register 122 for the volatile component variables JTAG VOL of the JTAG protocol and an optional register 123 for random data by a controller using a specific JTAG instruction, also indicated as JTAG Data—Freshness. In particular, the registers of the register group 120 comprise data identifying the memory device including the Flash memory array 100.

In fact, Flash memory arrays, as most of non volatile devices, contains for factory purpose, i.e. identification, some non volatile data to identify the die. Usually, this data is the time of testing, the die positioning in the wafer, the wafer number, other specific data. This data represents a very powerful source of random data, since the varies die by die. Suitably, such data are used to calculate an internal signature, as will be explained in the following description.

The access management architecture 110 thus further comprises a cryptographic group 130, in turn including a cryptographic algorithm 131, as well as a non volatile memory area 132 storing a specific data to be used by the cryptographic algorithm 131. As will be explained below, the specific data may be a Secret Key or Secret Data on the basis of the cryptographic function being used.

The cryptographic algorithm 131 comprises a mechanism for ensuring data freshness to avoid replay attack, for instance a monotonic counter or a time-stamp, to name few.

The cryptographic algorithm 131 can use a cryptographic HASH function.

A HASH function is a function that is used to map data of arbitrary size into data of a fixed size, returning values being called HASH values. More particularly, a HASH function always provides a result value, also indicated as digest, of a fixed length, starting from an initial data or message of variable length. Moreover, HASH functions are usually not reversible, so that an original data or value cannot be retrieved by the HASH value alone.

More particularly, the cryptographic algorithm 131 can use a Secure Hash Algorithm, or SHA.

According to an embodiment, the SHA-256 is used, providing HASH values having a size of the 32 Bytes independently from the length of an input data stream and having not shown any collision from its conception up to now.

Suitably, the cryptographic HASH function can use the special data being the Secret Data stored in the non volatile memory area 132 and the content of the registers of the register group 120 to calculate an internal signature according to the following formula:

Internally calculated signatures=HASH(JTAG NON VOL|JTAG VOL|Secret Data|JTAG data-freshness)

wherein the symbol | indicates the concatenation of two messages.

It should be remarked that the Secret Data are not essential for the working of the HASH algorithm.

For example, a SHA-256 function, starting from messages long up to tens of Terabits, is able to compress them in digests of a fixed length, in particular long only 32 bytes.

Alternatively, according to another embodiment, the cryptographic algorithm 131 uses a MAC function.

A MAC function is one-way function of two variables able to compress a message arbitrary long in a shot message of tens of bytes by using the specific data being a Secret Key, message and Secret Key being the two variables of the MAC function.

More particularly, the cryptographic algorithm 131 can use a Hash MAC function or HMAC.

Suitably, the cryptographic MAC function can use the specific data being the Secret Key stored in the non volatile memory area 132 and the content of one or more of the registers of the register group 120 to calculate an internal signature according to the following formula:

Internally calculated signatures=MAC(Secret Key, JTAG NON VOL|JTAG VOL|JTAG Data-Freshness)

wherein the symbol | indicates the concatenation of two messages.

It should be remarked that the Secret Key is in this case essential for the working of the MAC algorithm, such a Secret Key being 32 bytes long.

Also in this case, a HMAC-SHA-256 function, starting from messages long up to tens of Terabits, is able to compress them in digests of a fixed length, in particular long only 32 bytes, but it needs a Secret Key being 32 bytes long.

In other words, despite MAC and HASH functions appear similar, they are different in terms of resources needed to be implemented, calculus time and degree of security offered. In particular, many HASH functions are prone to the length extension attack, MAC functions not. The choice of the cryptographic functions could be made according to the final application of the Flash memory array 100.

The cryptographic algorithm 131 uses a symmetric cryptography. In particular, this cryptographic algorithm 131 can be used to ensure that a memory device including the Flash memory array 100 and a system on a chip or SoC are coupled in a unique manner.

As it is known, a SoC is a semiconductor integrated circuit that integrates all components of a computer or other electronic systems. These components typically include a central processing unit (CPU), input/output ports and secondary storage components, as well as a memory array, all on a single semiconductor substrate.

In this case, Data Freshness can eventually be sent by the SoC to make the opening of the factory mode unique. The SoC can be also replaced by a testing machine in the case that a field RMA is provided to the company The cryptographic algorithm 131 can be hardware/software implemented. In particular, an hardware implemented algorithm shows a high speed and the corresponding circuitry can be also used for other cryptographic purposes. Alternatively, a software implemented algorithm shows a low speed but does not require wafer area and could be sufficient for a test mode authentication according to the present disclosure.

The internally calculated signature is stored in a specific register of a signature storing area 140 of the access management architecture 110.

More particularly, the signature storing area 140 comprises a volatile register 141 being accessed from outside the Flash memory array 100 wherein a user is able to store a previously provided signature for authorizing the access of the user to the Flash memory array 100 in a specific (user dependent) test mode. The volatile register 141 is a data register of the JTAG protocol, also indicated as Test Signature.

The signature storing area 140 the comprises a further volatile register 142 wherein the signature being internally calculated by the cryptographic algorithm 131 is stored.

Suitably, the user provided signature as stored in the volatile register 141 is compared with the signature being internally calculated by the cryptographic algorithm 131 and stored in the further volatile register 142, the access to the test mode of the Flash memory array 100 being allowed only in case of correspondence between these signatures.

Figure 1B:
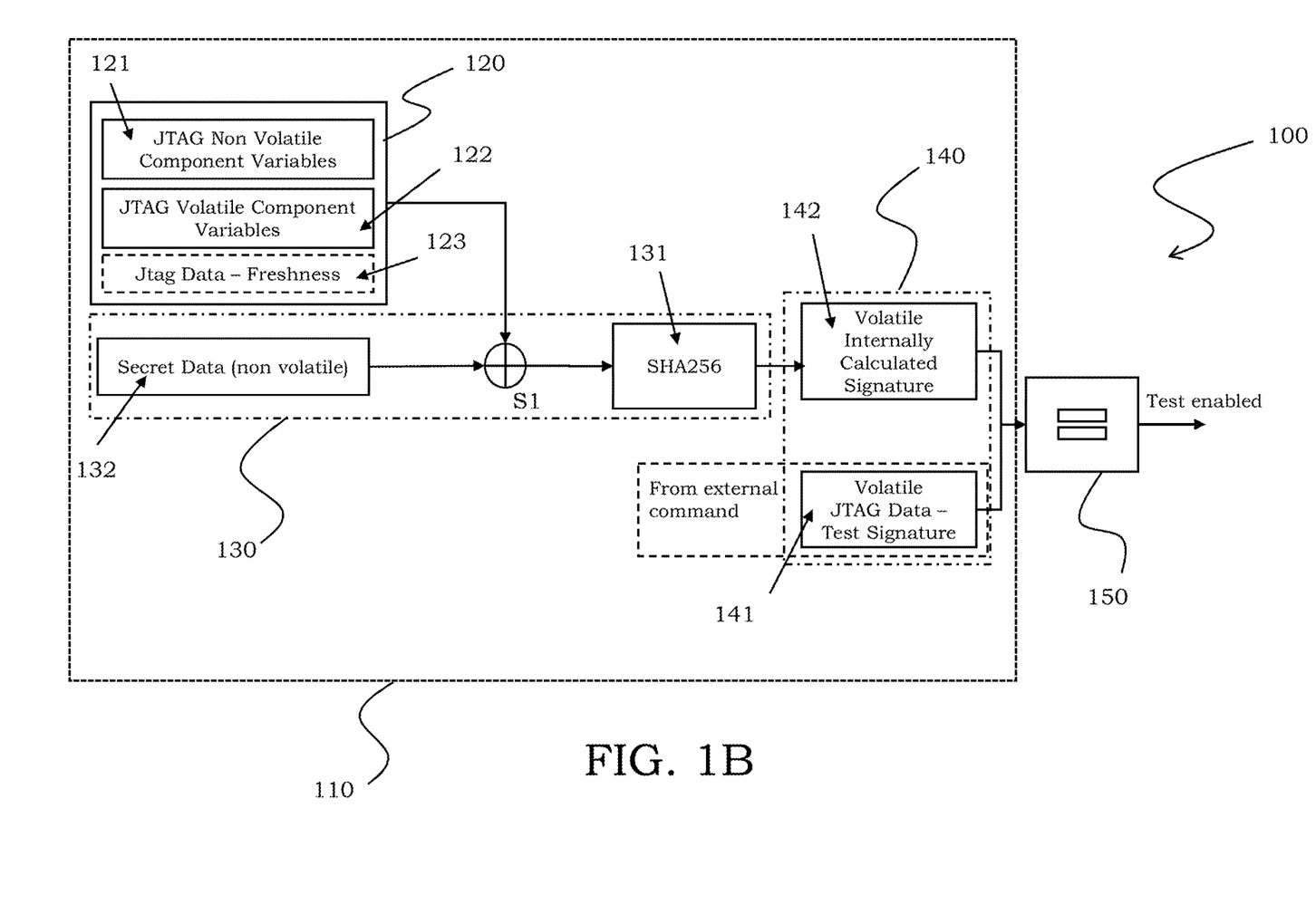
FIG. 1B shows a block diagram of the access management architecture of the Flash memory array of FIG. 1A in accordance with an embodiment of the present disclosure.

The working of the access management architecture 110 is shown in FIG. 1B. As it is shown in this figure, the data from the register group 120 are aggregated with the specific data, in this case the Secret Data stored in the non volatile memory area 132, as illustrated by using a summing node 51, and send to the cryptographic algorithm 131 being a SHA-256 function, in order to calculate the internal signature to be stored in the further volatile register 142 of the signature storing area 140.

Figure 1C:
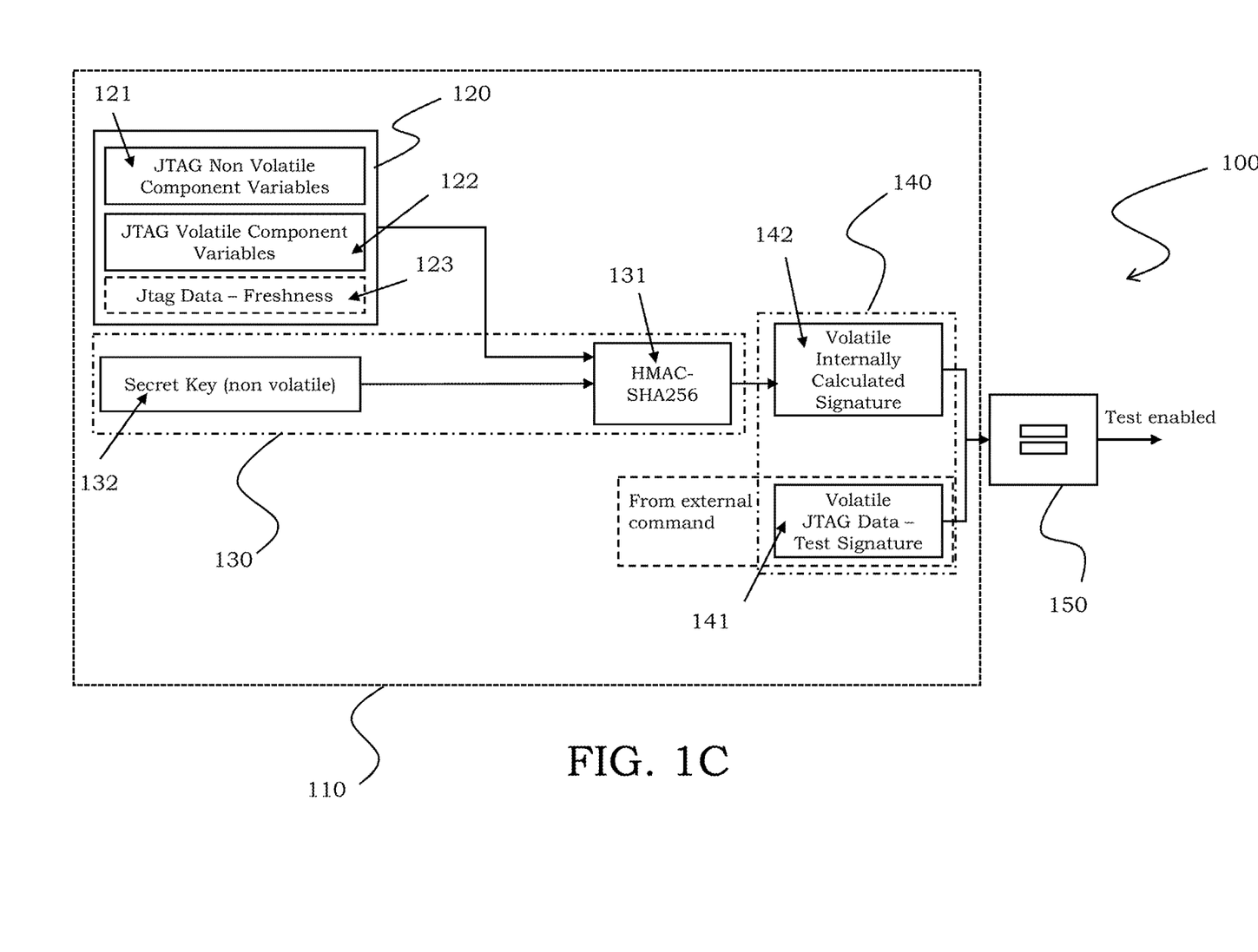
FIG. 1C shows a block diagram of the access management architecture of the Flash memory array of FIG. 1A in accordance with another embodiment of the present disclosure.

An alternative embodiment is shown in FIG. 1C, wherein the cryptographic algorithm 131 is a HMAC-SHA256 function. According to this alternative embodiment, the data from the register group 120 and the Secret Key stored in the non volatile memory area 132 are directly send to the cryptographic algorithm 131 being a HMAC-SHA256 function, in order to calculate the internal signature to be stored in the further volatile register 142 of the signature storing area 140.

The cryptographic algorithm 131 further comprises a mechanism for ensuring data freshness to avoid replay attack, for instance a monotonic counter or a time-stamp, to name few.

The internally calculated signature is then compared to the Test Signature provided by a user through an external command and stored in the volatile register 141, the comparison being performed in a comparison block 150, which provide a Test enabled signal.

The comparison block 150 may be an electronic circuit, a microprocessor or a microcontroller and/or a portion of an electronic device or microprocessor/microcontroller; they may also be computer instructions stored in a computer-readable medium that may be executed by a controller or a computer.

The registers 121, 122 or 123 of the register group 120 as well as the registers 141 and 142 of the signature storing area 140 may be electronic circuits, memory cells, or memory portions; they may also be computer instructions stored in a computer-readable medium that may be executed by a controller or a computer.

More particularly, the access management architecture 110 is used only after a first power-up of the Flash memory array 100, namely after a factory production test, wherein the specific data being a Secret Key/Secret Data is provided and stored into the non volatile memory area 132. Suitably, a non volatile internal flag can be set and the cryptographic algorithm 131 can accessible in a Test mode, prompting a request for an external command which contains a field for a user provided signature for authentication.

By considering a Soc including the Flash memory array 100 as well as at least an external controller able to read a JTAG register, an access management algorithm using the access management architecture 110 would comprise the following steps:

the external controller moves to ShiftIR to read the second register 122 for the volatile component variables JTAG VOL of the JTAG protocol so as to read a JTAG Read Instruction, then moves to RUN/TEST/IDLE and moves to ShiftDR to read the content of this second register 122, then allowing the Flash memory array 100 to calculate the internal signature and store it in the further volatile register 142;

the SoC moves to ShiftIR to load a Test_Signature_Command, allowing a user to insert a previously provided signature, then moves to ShiftDR to load this signature and store it in the volatile register 141 and moves to RUN/TEST/IDLE; and the Flash memory array 100 compares the contents of the volatile register 141 and the further volatile register 142, i.e. the user provided signature with the internally calculated signature, to allow a Test Mode entry for the SoC.

Optionally, the external controller moves to ShiftIR to write the optional register 123 for random data or JTAG Data—Freshness, moves to ShiftDR to provide a randomic value, moves to RUN/TEST/IDLE before allowing the Flash memory array 100 to calculate the internal signature and store it in the further volatile register 142.

In this case, the Test Mode could be a high test mode level, such as a Factory Test mode, in particular allowing a full access to the Flash memory array 100. Alternatively, a different test mode level could be allowed, with some limitation to the access to the Flash memory array 100.

The present disclosure also relates to a method for managing access to a Flash memory array into a test mode, implemented by the Flash memory array 100 comprising the access management architecture 110.

The method comprises the steps of:
providing data stored in one or more register of the register group 120 of the Flash memory array 100, along with a specific data being a Secret Key/Secret Data stored in the non volatile memory area 132 to a cryptographic algorithm 131;
calculating an internal signature;
verifying data freshness;
prompting a user to insert a previously provided signature;

comparing the internally calculated signature with the user provided signature;

allowing access to the Flash memory array 100 in a test mode in case of matching signatures.

In particular, the provided data may be stored in the first register 121 for the non volatile component variables JTAG NON VOL of the JTAG protocol, and/or in the second register 122 for the volatile component variables JTAG VOL of the JTAG protocol and eventually in the optional register 123 for random data by a controller using a specific JTAG instruction, JTAG Data—Freshness.

The cryptographic algorithm 131 may comprise a mechanism for ensuring data freshness to avoid replay attack, for instance a monotonic counter or a time-stamp, to name few.

Moreover the cryptographic algorithm 131 may be a MAC and HASH functions, namely a SHA-256 or a HMAC.

Also, the comparison step may provide a Test enabled signal.

The Flash memory array could be provided with an access management algorithm supporting access to different testing mode levels.

Figure 2A:
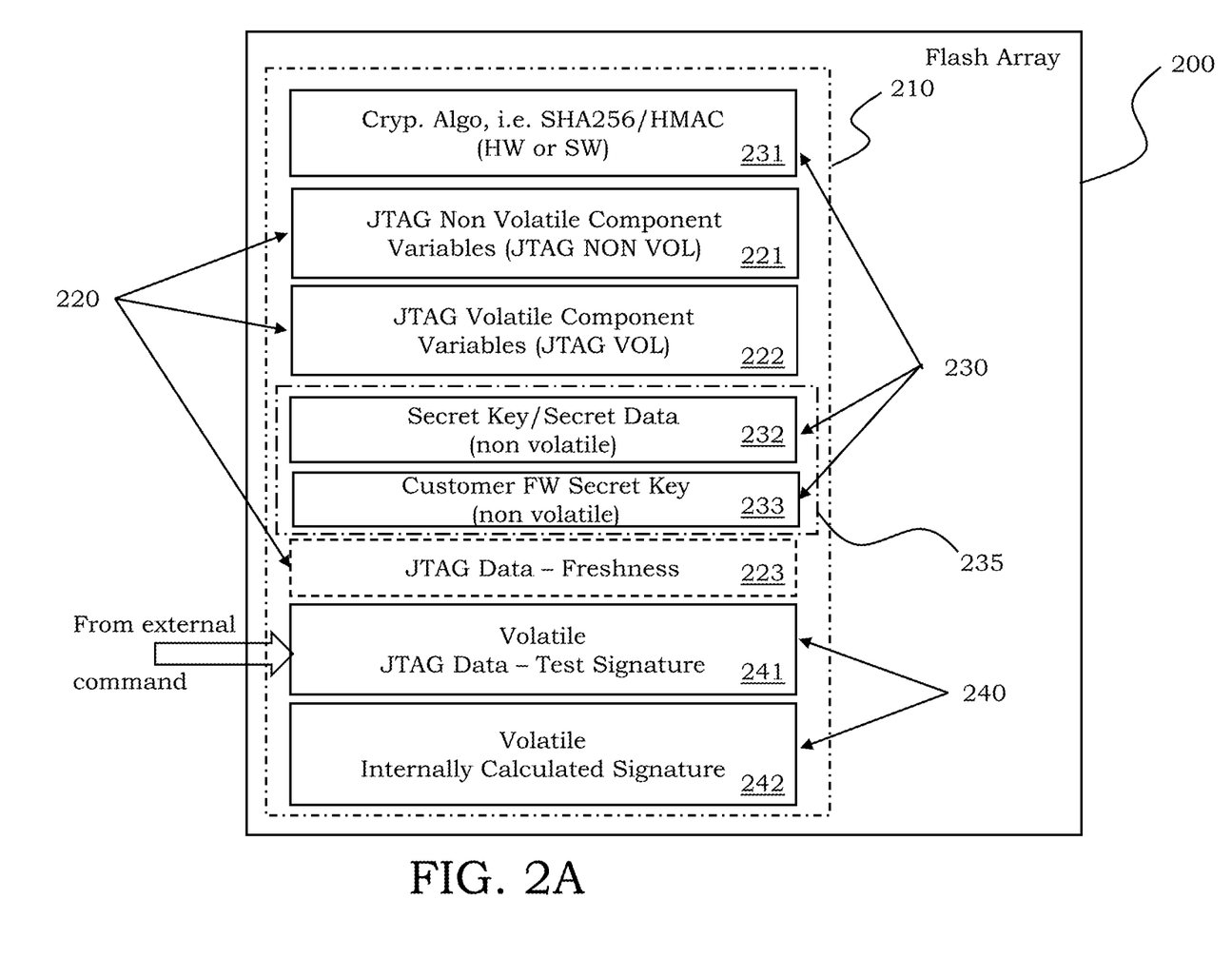
FIG. 2A shows a block diagram of a Flash memory array provided with an access management architecture in accordance with an alternative embodiment of the present disclosure.

This alternative embodiment is shown in FIG. 2A, the Flash memory array being globally indicated with 200.

Similarly to the embodiment shown in FIG. 1A, the Flash memory array 200 comprises an access management architecture 210, in turn including:

a register group 220 comprising a first register 221 for the non volatile component variables JTAG NON VOL of the JTAG protocol, a second register 222 for the volatile component variables JTAG VOL of the JTAG protocol and an optional register 223 for random data by a controller using a specific JTAG instruction, JTAG Data—Freshness;

a cryptographic group 230 comprising a cryptographic algorithm 131, as well as a non volatile memory area 232 storing a specific data being a Secret Key or Secret Data to be used by the cryptographic algorithm 231; and a signature storing area 240 comprising a volatile register 241 being accessed from outside the Flash memory array 100 wherein a user is able to store a previously provided signature and a further volatile register 242 wherein the signature being internally calculated by the cryptographic algorithm 231 is stored.

The cryptographic algorithm 131 may comprise a mechanism for ensuring data freshness to avoid replay attack. In this case the optional register 223 may contain a monotonic counter value, a time-stamp value, or any other data able to implement a freshness (i.e. anti-replay) mechanism.

Also in this case, the cryptographic algorithm 231 can use SHA function, in particular a Secure Hash Algorithm, or SHA, namely the SHA-256 function, or a MAC function, in particular Hash MAC function or HMAC, namely the HMAC-SHA256 function.

Suitably, the access management architecture 210 according to this alternative embodiment comprises a further non volatile memory area 233 storing a Customer specific data being a Customer Secret Key or Customer Secret Data to be used by the cryptographic algorithm 231 in combination with the specific data being a Secret Key or Secret Data stored in the non volatile memory area 232. The access management architecture 210 thus comprises a non volatile memory block 235 including the non volatile memory area 232 and the further non volatile memory area 233.

In particular, the Customer specific data being a Customer Secret Key or Customer Secret Data stored in the further non volatile memory area 233 can be used in order to authorize access to the Flash memory array 200 in a test mode having different capacities with respect to the test mode accessed thanks to the specific data being a Secret Key or Secret Data stored in the non volatile memory area 232.

The test mode allowable for customers are decided by the manufactured of the Flash memory array 200 during the so called field failure support, usually a reduced suite of Test mode with respect to a complete access, usually reserved to the manufacturer itself.

In a general manner, a plurality of Customer specific data, being Customer Secret Keys or Customer Secret Data can be stored in the further non volatile memory area 233 to authorize different access level to the Flash memory array 200 in different suites of test mode. For instance, a different specific data being a Secret Key or Secret Data can be assigned to each customer.

Figure 2B:
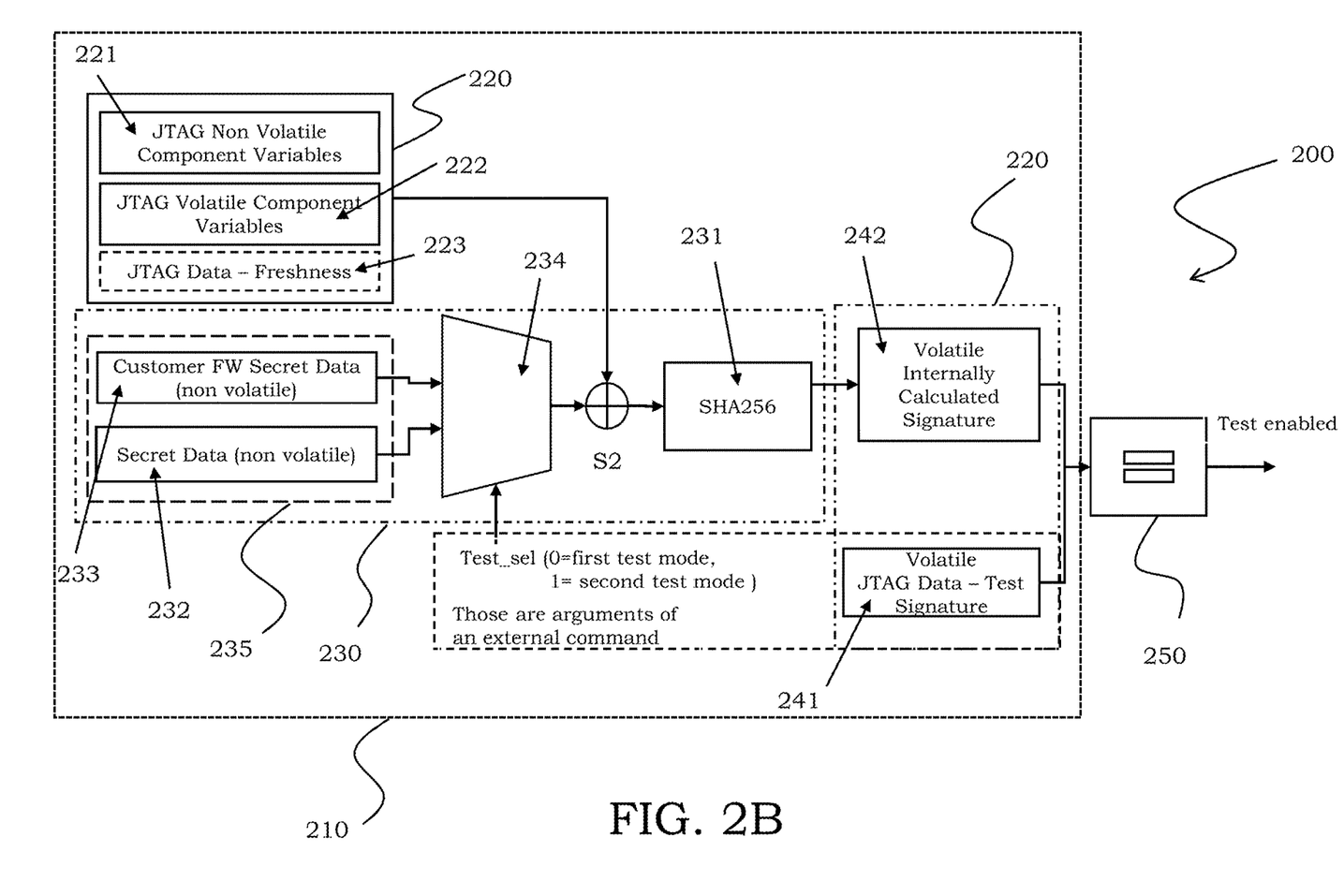
FIG. 2B shows a block diagram of the access management architecture of the Flash memory array of FIG. 2A in accordance with an alternative embodiment of the present disclosure.

The working of the access management architecture 210 is shown in FIG. 2B, wherein the cryptographic algorithm 231 is a SHA-256 function. As it is shown in this figure, the access management architecture 210 comprises a decisional multiplexer 234 receiving the specific data being a Secret Data stored in the non volatile memory area 232 and the Customer specific data being a Customer Secret Data stored in the non volatile memory block 235 and providing one of them on the basis of a command signal Test_sel, wherein Test_sel=0 correspond to selecting the specific data being the Secret Data, i.e. a first test mode, and Test_sel=1 correspond to selecting the Customer specific data being the Customer Secret Data, i.e. a second test mode.

According to an embodiment, the command signal Test_sel is provided by a user through an external command.

Alternatively, the command signal Test_sel may be self-determined by the memory architecture 100 if the received signature matches one of the signatures as calculated by using one of the Secret Keys/Secret Data fields stored inside the memory architecture 100 itself.

The selected specific data being Secret Data are aggregated to the data from the register group 220, as illustrated by using a summing node S2, and send to the cryptographic algorithm 231 being a SHA-256 function in order to calculate the internal signature to be stored in the further volatile register 242 of the signature storing area 240.

Figure 2C:
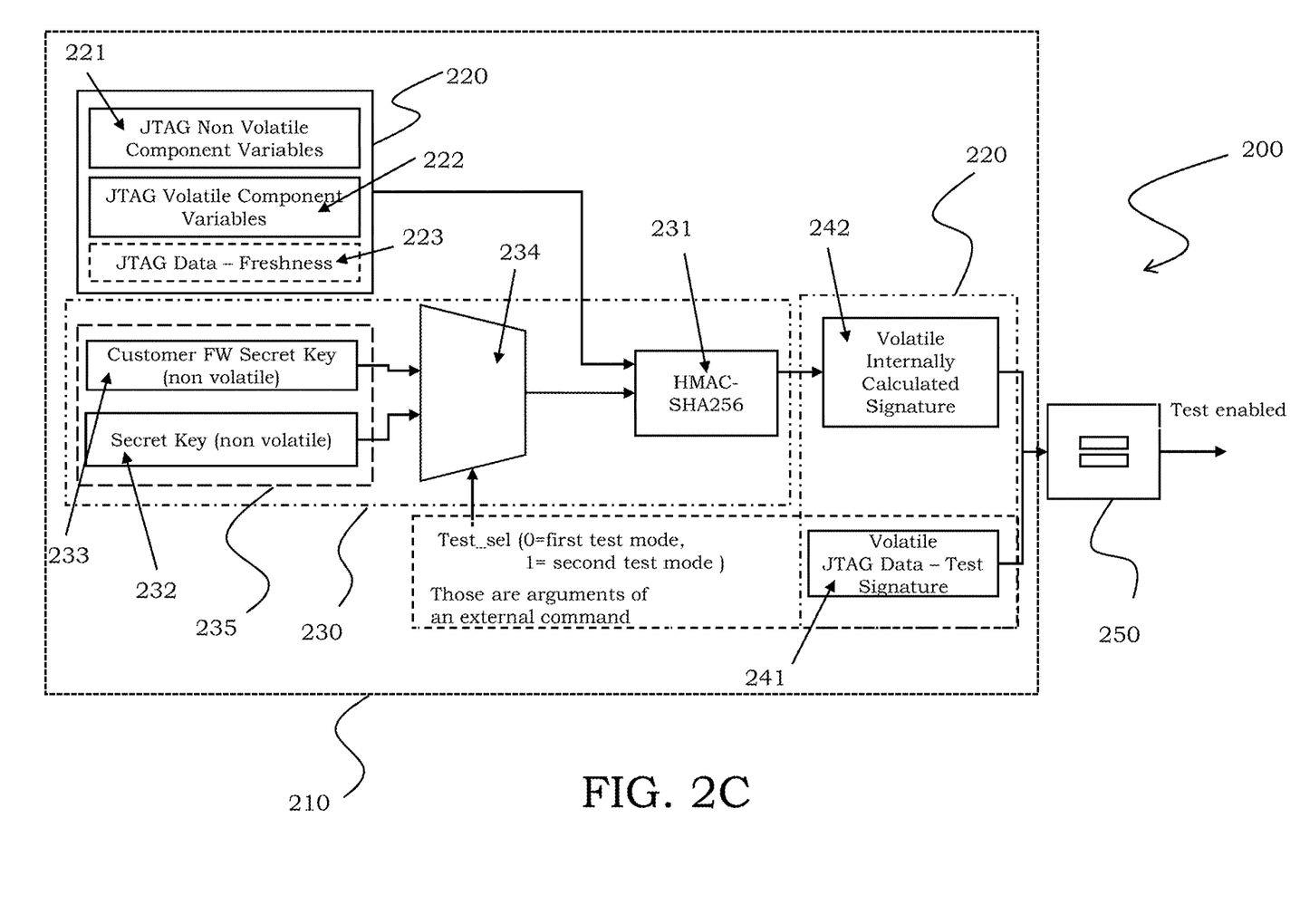
FIG. 2C shows a block diagram of the access management architecture of the Flash memory array of FIG. 2A in accordance with another alternative embodiment of the present disclosure.

An alternative embodiment is shown in FIG. 2C, wherein the cryptographic algorithm 231 is a HMAC-SHA256 function. According to this alternative embodiment, the data from the register group 220 and the selected specific data being a Secret Key are directly sent to the cryptographic algorithm 231 being a HMAC-SHA256 function in order to calculate the internal signature to be stored in the further volatile register 242 of the signature storing area 240.

Such an internally calculated signature is then compared to the Test Signature provided by a user through an external command and stored in the volatile register 241, the comparison being performed in a comparison block 250, which provide a Test enabled signal corresponding to the test mode selected by the command signal Test_sel.

Also the Flash memory array 200 according to this alternative embodiment implements the above indicated method for managing access into a test mode of the same.

In this case, the method further comprises a step for selecting the specific data being a Secret Key/Secret Data stored in the non volatile memory area 232 or the Customer specific data being a Customer Secret Key/Customer Secret Data stored in the non volatile memory block 235 and providing the selected data to the cryptographic algorithm 231, so allowing access to more than one test mode.

Summing up, the present disclosure provides a Flash memory array which comprises an access management architecture in order to authorize access to the memory array only to allowed users in a corresponding test mode.

Moreover, the access management architecture is able to authorize different access level to the Flash memory array in different suites of test mode, namely different for each customer.

The employed cryptographic algorithm uses data able to identify the device comprising the Flash memory array, in particular volatile and non volatile component variables JTAG VOL of the JTAG protocol, as well as random data by a controller using a specific JTAG instruction. This data are extremely useful being random data which varies die by die.

Suitably, the cryptographic algorithm can use cryptographic HASH or MAC functions being able to map data of arbitrary size into data of a fixed size, in a not reversible manner. The choice of the cryptographic functions could be made according to the final application of the Flash memory array and it can be hardware/software implemented.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. A memory device, comprising:
   an array of memory cells; and
   an access management architecture providing a secure access to a test mode of the array of memory cells, the access management architecture comprising:
   a register group comprising data identifying the memory device;
   a cryptographic algorithm calculating an internal signature having a mechanism for ensuring data freshness;
   a first non-volatile memory area storing specific data to be used by the cryptographic algorithm for calculating the internal signature;
   a second non-volatile memory area storing customer specific data to be used by the cryptographic algorithm for calculating the internal signature to authorize access to the memory array in more than one test mode;
   a comparison block for comparing the calculated internal signature with a user provided signature to generate an enable signal allowing access to the test mode of the array of memory cells; and
   a decisional multiplexer to:
   receive the specific data and the customer specific data; and
   provide the specific data or the customer specific data to the cryptographic algorithm on the basis of a command signal.

2. The memory device of claim 1, wherein the cryptographic algorithm uses a secure hash function.

3. The memory device of claim 1, wherein the cryptographic algorithm uses a Message Authentication Code (MAC) function.

4. The memory device of claim 3, wherein the specific data stored in the non-volatile memory area is a Secret Key of the MAC function.

5. The memory device of claim 1, further comprising a register for storing the calculated internal signature.

6. The memory device of claim 1, further comprising a register being accessed from outside the memory array to store a signature previously provided by a user.

7. The memory device of claim 6, wherein the register storing the previously provided signature is a data register of a Joint Test Action Group (JTAG).

8. The memory device of claim 1, wherein the register group comprises a first register for non-volatile component variables of a Joint Test Action Group (JTAG) protocol and a second register for volatile component variables of the JTAG protocol.

9. The memory device of claim 8, wherein the register group further comprises a register for random data by a controller using a specific JTAG instruction.

10. The memory device of claim 1, wherein the cryptographic algorithm is hardware implemented.

11. A method for managing access to a memory array, comprising:
    providing data identifying a memory device including the memory array, along with specific data to a cryptographic algorithm;
    calculating an internal signature;
    verifying data freshness;
    prompting a user to insert a previously provided signature;
    comparing the internally calculated signature with the user provided signature;
    allowing access to the memory array in a test mode in case of matching signatures;
    storing a customer specific data; and
    selecting the specific data or the customer specific data to access different testing modes.

12. The method of claim 11, further comprising storing the data identifying the memory device in a register of a Joint Test Action Group (JTAG) protocol.

13. The method of claim 11, wherein the cryptographic algorithm uses a secure hash function, a Message Authentication Code (MAC) function, or both.

14. The method of claim 11, further comprising storing the specific data in a register of the memory array.

15. The method of claim 11, wherein comparing the internally calculated signature with the user provided signature provides a test enabled signal.

16. The method of claim 11, wherein selecting the specific data or the customer specific data to access different testing modes is performed by a decisional multiplexer.

17. A system, comprising:
- a System-on-Chip (SoC) component including a memory device, the memory device comprising:
  - an array of memory cells; and
  - an access management architecture providing a secure access to a test mode of the array of memory cells, the access management architecture comprising:
    - a register group comprising data identifying the memory device;
    - a cryptographic algorithm calculating an internal signature having a mechanism for ensuring data freshness;
    - a first non-volatile memory area storing specific data to be used by the cryptographic algorithm for calculating the internal signature;
    - a second non-volatile memory area to store customer specific data to be used by the cryptographic algorithm to calculate the internal signature to authorize access to the memory array in more than one test mode;
    - a comparison block for comparing the calculated internal signature with a user provided signature to generate an enable signal allowing access to a test mode of the array of memory cells; and
    - a decisional multiplexer to receive the specific data and the customer specific data and to provide the specific data or the customer data to the cryptographic algorithm on the basis of a command signal.

18. The system of claim 17, wherein the memory device further comprises:
- a register for storing the internally calculated signature; and
- a register being accessed from outside the memory array and configured to store a previously provided signature provided by a user.

* * * * *

UNITED STATES PATENT AND TRADEMARK OFFICE
CERTIFICATE OF CORRECTION

PATENT NO. : 11,392,300 B2  
APPLICATION NO. : 16/624473  
DATED : July 19, 2022  
INVENTOR(S) : Alberto Troia et al.

Page 1 of 1

It is certified that error appears in the above-identified patent and that said Letters Patent is hereby corrected as shown below:

In the Claims

Column 12 Line 14 In Claim 17, should read: "specific data or the customer specific data to the crypto-"

Signed and Sealed this  
First Day of November, 2022

Katherine Kelly Vidal  
*Director of the United States Patent and Trademark Office*